United States Patent [19]
Seefluth

[11] 4,026,984
[45] May 31, 1977

[54] METHOD FORMING AN ORIENTED ARTICLE HAVING A BEAD ATTACHED BY A TAPERED STEM

[75] Inventor: Charles L. Seefluth, Bartlesville, Okla.

[73] Assignee: Phillips Petroleum Company, Bartlesville, Okla.

[22] Filed: Sept. 26, 1975

[21] Appl. No.: 617,257

Related U.S. Application Data

[62] Division of Ser. No. 443,473, Feb. 19, 1974, Pat. No. 3,917,095, which is a division of Ser. No. 250,293, May 4, 1972, Pat. No. 3,817,676.

[52] U.S. Cl. .................................. 264/99; 264/89; 264/163
[51] Int. Cl.² ........................................ B29C 17/07
[58] Field of Search ................. 264/89, 94, 96, 97, 264/98, 99, 248, 163; 425/302 B, 387 B, DIG. 212, 326 B; 215/1 C

[56] References Cited
UNITED STATES PATENTS

| | | | |
|---|---|---|---|
| 3,417,892 | 12/1968 | Schweiger | 215/1 C |
| 3,595,116 | 7/1971 | Gilbert | 83/176 |
| 3,686,379 | 8/1972 | Gilbert | 264/99 X |

*Primary Examiner*—Jan H. Silbaugh

[57] ABSTRACT

The strength of the seal of an open end parison preform fabricated at orientation temperature is increased by forming a dependent bead within a closely adjacent longitudinal recess. In an alternate embodiment the appearance of seals is improved, and pin holes reduced by forming a dependent bead in a manner such that the longitudinal stem (web) connecting the bead flares outward adjacent a bottom wall of the article being molded.

5 Claims, 10 Drawing Figures

METHOD FORMING AN ORIENTED ARTICLE HAVING A BEAD ATTACHED BY A TAPERED STEM

CROSS REFERENCE TO RELATED APPLICATION

This is a divisional of copending application Ser. No. 443,473, filed Feb. 19, 1974, now U.S. Pat. No. 3,917,095 which in turn is a divisional of then copending application Ser. No. 250,293, filed May 4, 1972, now U.S. Pat. No. 3,817,676.

BACKGROUND OF THE INVENTION

This invention relates to sealing an open end parison at orientation temperature.

The blow molding art goes back for over one hundred years. Traditionally, blow molded articles have been formed by the downward extrusion of a molten parison from an annular die into position between opposing mold halves. The mold halves have been closed and fluid pressure introduced into the parison to expand same into conformity with the mold. Recently, techniques have been developed whereby high strength articles having exceptional sparkle and clarity can be produced by blow molding a parison preform which has been cooled to room temperature and thereafter reheated to orientation temperature so as to achieve molecular orientation in the resulting article during the fabrication steps. It is apparent that the most economical manner to produce individual parison preforms is to extrude a continuous length of tubular material and thereafter sever it into individual work pieces, as opposed to injection molding a closed end parison preform, for instance. However, this preferred method of forming individual parison preforms carries with it the inherent disadvantage of providing a preform which is open at each end and which, therefore, must be closed at one end preparatory to blow molding. Thus, in order to operate economically with individual parison preforms the artisan is faced with the problem of achieving a seal in a parison which is at orientation temperature and thus far below the temperature at which the parison would be tacky and easily sealable. It has been found that such preforms can be sealed with improved reliability by forming a dependent bead along the seal line. However, even with the dependent bead, the weakest point in the resulting bottle or other article is generally the seal area with the article generally failing along a line perpendicular to the seal line. That is, the seal does not break open but rather the bottom of the bottle on severe impact splits along a line perpendicular to the direction of the seal. Also, on the inside of the bottle adjacent the seal line there is formed an area having voids and a generally rough appearance.

SUMMARY OF THE INVENTION

It is an object of this invention to seal an open end parison preform at orientation temperature;

It is a further object of this invention to provide an improved seal on parison preforms;

It is yet a further object of this invention to make possible the economic production of high strength, clear bottles having improved seals; and It is still yet another object of this invention to provide an improved method for forming seals in parison preforms at orientation temperature.

In accordance with this invention an open end parison preform is stretched longitudinally after which the walls are sealed together and severed to form a depending bead along the seal line within a closely adjacent longitudinal recess. In accordance with an alternative embodiment of the invention, a parison preform is stretched longitudinally after which the walls are sealed together in such a manner as to form a bead along the seal line connected to the bottom wall of the article being produced by a longitudinal stem which flares outward adjacent the bottom wall of the article being molded.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
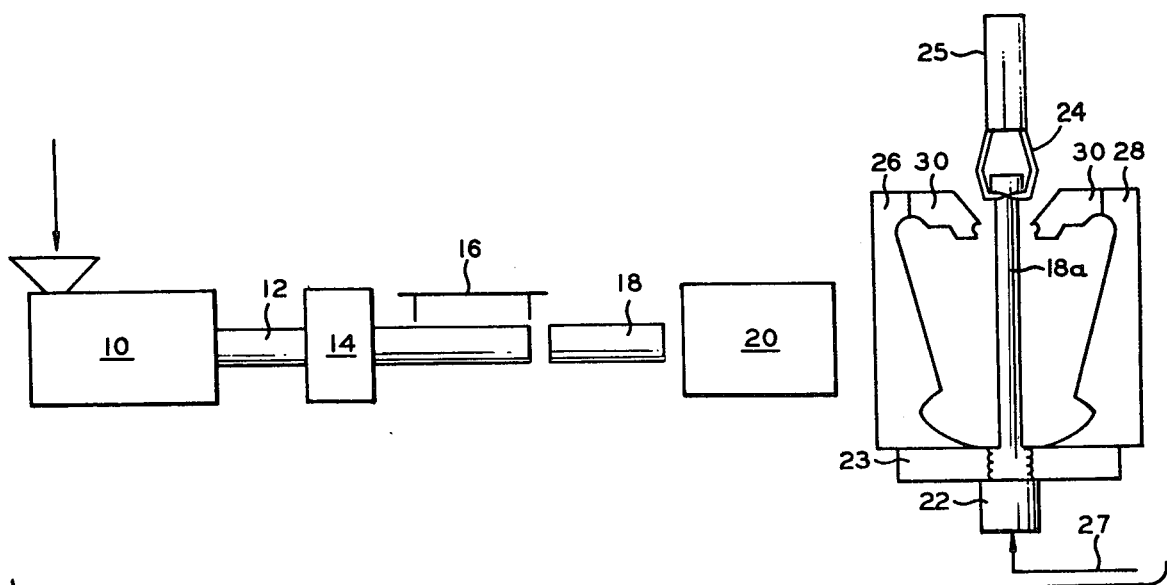
FIG. 1 is a schematic representation of apparatus for forming and sealing parison preforms in accordance with the instant invention.

The parison preforms which are sealed in accordance with the instant invention can be made from any orientable material such as poly(vinyl chloride), polyesters, polymers of at least one mono-1-olefin having 2 to 8 carbon atoms per molecule, preferably polymers and copolymers of ethylene, propylene, and butene, more preferably polypropylene.

The open end parison preforms to be sealed in accordance with this invention can be formed by any means known in the art, although the preferred means is to simply extrude a tube or pipe in a manner conventional in the art and thereafter sever this continuous extrudate into work pieces of the desired length.

The open end parison preforms are heated to orientation temperature preparatory to sealing and blow molding. By orientation temperature is meant that temperature at which polymers exhibit an increase in strength on stretching. For crystalline polymers such as polymers of mono-1-olefins having 2 to 8 carbon atoms per molecule, this temperature is generally in the range of 1° to 50° F, preferably 10° to 30° F, below the crystalline melting point. The crystalline melting point can be determined by placing a small sample of the material to be tested on a heating stage of a polarizing microscope and recording the crystalline melting point as that temperature at last birefringence disappears on slow heating. The individual open end parison preforms can be reheated to this orientation temperature in an air oven, in a liquid bath, in a heating block, or by subjecting them to radiant heat, or any other suitable means. For amorphous polymers a temperature of 40–200, preferably 75°–150° F below the homogeneous melt point is satisfactory.

In accordance with the invention the parison preform is stretched longitudinally and thereafter the sealing and severing members are closed on a stretched portion thereof. Preferably, preblow fluid is introduced into the interior of the parison to expand it slightly prior to the time the mold halves close on the stretched portion of the parison to seal and sever same. The longitudinal stretch ratio should be in the range of 1.1:1 to 8:1, preferably 1.5:1 to 2.5:1. By longitudinal stretch ratio is meant the ratio of the length of the parison to be stretched (i.e., the portion of the parison between the gripping means) after stretching to its length before stretching. A ratio of 1:1 would indicate no affirmative stretching prior to introduction of the blow fluid.

As noted hereinabove, it is highly preferred that the stretched parison be preblown slightly prior to closing the mold on it to effect sealing. This necessitates some means for temporarily closing off one end of the parison prior to the time the mold closes and forms the final seal. It is preferred that this be done simply by grasping one end of the parison with a thread-forming means and the other end between two pinching means which serve to close the parison off. The thread-forming means and the pinching means can then be moved axially apart to effect the longitudinal stretch and fluid pressure can be introduced through a hollow mandrel in the thread-forming means with the escape of preblow fluid being precluded by the fact that the walls are closed together at the other end thereof by the pinching fingers. Alternatively, a plug can temporarily be placed in the open end of the parison or the open end could be connected to the same source of preblow fluid as the other end so as to have fluid back pressure on the interior of the parison.

The preblow fluid must be introduced under a greater pressure than the 3 to 6 psi normally used for preblowing in conventional blow molding operations in which hot extruded parisons are used. Preblow pressure of at least 25 psig is preferred with a range of 25 to 50 psig being entirely satisfactory.

The sealing and severing means has a severing edge which is the furthermost extension thereof; this severing edge cooperates with a matching edge on the opposing mold half to sever the parison. Adjacent a bottom wall-forming portion of the sealing and severing section of the mold halves is a holding projection which cooperates with a matching projection on the opposing mold half to hold said thus severed parison within a bead-forming mold to be described hereinbelow. Between the holding projection and the severing edge of each sealing and severing means is a relatively small cavity which, in cooperation with a matching cavity on the other mold half, forms a bead-forming mold. Preferably, this bead mold generally has a circular configuration although other configurations can also be used. This bead mold preferably has a maximum lateral dimension of 15 to 25 percent of the combined thickness of the two walls of the parison prior to stretching. For parisons having a wall thickness before stretching of 150 mils, a maximum lateral dimension of this bead mold of 45 to 75 mils is satisfactory.

As noted hereinabove, it has been found that articles sealed in this manner tend to fail at what would appear to be the strongest point in the entire article, that is, at right angles to the seal and an area which is generally several times thicker than the adjacent surrounding area. Thus while the combination of a preblow and bead seal essentially solves the difficult problem of obtaining a seal at orientation temperature, there remains the problem of inadequate impact strength in a direction perpendicular to the seal in cases where the bottles are subjected to unusually rough handling. Surprisingly, it has been found that if this bead and stem are formed in a closely adjacent longitudinal recess, the impact strength is greatly improved.

Even in applications where exceptional impact strength is not necessary there has been found a tendency for voids to form on the inside of the bottle along the seal line giving a rough and unsightly appearance and in some instances actually resulting in pin holes. Surprisingly, it has been found that if the stem connecting the bead to the bottom wall of the article being molded flares slightly outward adjacent the bottom wall the appearance is improved greatly and the tendency to have pin holes is essentially eliminated. This phenomenon appears to defy explanation although in light of the unexpected effectiveness of the provisions for a slight flaring outward of the stem adjacent the wall it can be speculated that the voids were caused in the first place by the severing member in pressing against the outside wall of the parison effecting a cut on the inside wall.

In a preferred embodiment the recessed bead is used in combination with the flared stem to give both a mechanically stronger seal and also a more reliable seal in that permeability is decreased because of the virtual elimination of pin holes and/or thin areas along the seal line; in addition, the appearance is improved.

While it is not essential to the invention, it is preferred that the sealing and severing means have surfaces sloping back from the severing edge on the side opposite said bead-forming cavity at an angle such that the included angle of the opposed surfaces when the mold parts are in a closed position is within the range of 15° to 100°, preferably 25° to 90°, more preferably 30° to 47°. In this way, lateral pressure on the tail portion of the parison which is being severed has a vertical component of force which is sufficient to cause the severed tail portion to fall free from the portion of the parison and held within the bead-forming cavity.

That portion of the mold which constitutes the sealing and severing means can be made of any suitable material. A preferred material is Vega steel, hardened to a 59 to 60 Rockewll C hardness.

Referring now to the drawings, particularly FIG. 1, there is shown an extruder 10 for forming a tubular extrudate 12. Molten tubular extrudate 12 passes immediately into vacuum cooling and sizing chamber 14. The solidified tubular extrudate then passes from sizing chamber 14 to cutting means 16 where it is severed into individual open end parison preforms 18. Parison preforms 18 pass through air oven 20 where they are heated to orientation temperature. They are then transferred to thread-forming head 22 by gripping fingers 24 which are brought together by means of air cylinders or cams, not shown. Thread-forming head 22 can, for instance, be identical to that shown in Turner et al, U.S. Pat. No. 3,390,426, the disclosure of which is hereby incorporated by reference. Relative movement is then effected between thread-forming head 22 having jaw means 23, and gripping fingers 24 by means of either raising gripping fingers 24, through the action of cylinder 25 which serves as a means to effect relative axial movement, to the position shown in FIG. 1 or else by means of lowering head 22 through the action of an air cylinder, for example, not shown to stretch the parison to the elongated condition depicted by referenced character 18a. Preblow air is introduced through line 27. Mold halves 26 and 28 then close on the thus stretched parison. Sealing and severing inserts 30 in mold halves 26 and 28 perform the mechanical operation of bringing the parison walls into intimate contact and severing the parison as blow air is introduced through line 27 to inflate the parison.

Figure 2:
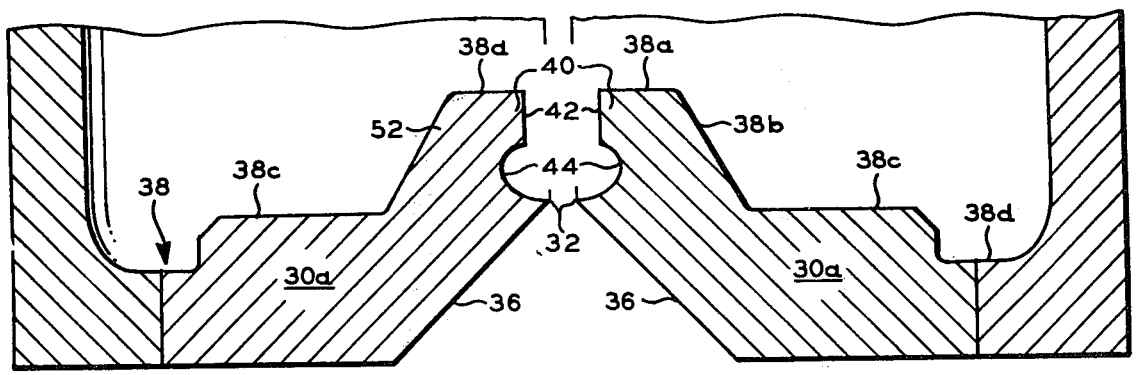
FIG. 2 is an enlarged detailed section of sealing and severing members in accordance with the invention.

FIG. 2 shows in detail sealing and severing inserts 30a in accordance with one embodiment of the invention. Each insert has a severing edge 32 which severs the parison along the sealing line. Surfaces 36, 36 slope downwardly and outwardly (in these figures the parts are disposed as though the bottle were being blown right side up although as shown from FIG. 1, the bottle can also be blown upside down which in many instances is the preferred arrangement) from severing edges 32 to form an included angle as shown in the drawing of about 47°. Adjacent narrow bottom wall-forming surfaces 38a, which form narrow longitudinal portions of the bottom of the article being molded, there are parison holding projections 40, 40. In this figure each parison holding projection 40 has a flat land area disposed parallel to the parting line of the mold as depicted by reference character 42. As can be seen stem forming surface 42 is adjacent an opposite edge of cavity 44 from edge 32. Small longitudinal bead-forming cavity 44 cooperates with a similar cavity in the opposing insert to form a mold which forms a bead 46 connected with the bottom wall 48 by means of longitudinal stem 49 (see FIG. 8). Member 49 is referred to herein as a "stem" because in cross section it has the shape of a stem. Since it is longitudinal it is actually a web or tab. Bead 46 generally depends downwardly from lower surface 48 of the bottom wall section of the molded article a distance of 10 to 400, preferably 25 to 75, mils, that is, this is the height of stem 49. Of course, this will vary greatly depending upon the size of the parison being molded. Relative to the parison being molded, the height of the stem and bead will generally be 0.1 to 3, preferably 0.3 to 1.3 times a single wall thickness of the parison before stretching. Stated in terms relative to the size of the article being molded, the distance from severing edge 32 to surface 38a will generally be 0.006 to 0.2, preferably 0.02 to 0.1 times the average diameter of the bottom wall forming portion of the mold. Generally the bottom of bead 46 will be just flush with surface 56 (see FIG. 8) of the article. As above, the words "downwardly", "height", etc. are not meant to be limiting but are simply convenient descriptive terms, it being understood that the article can be upside down.

Figure 8:
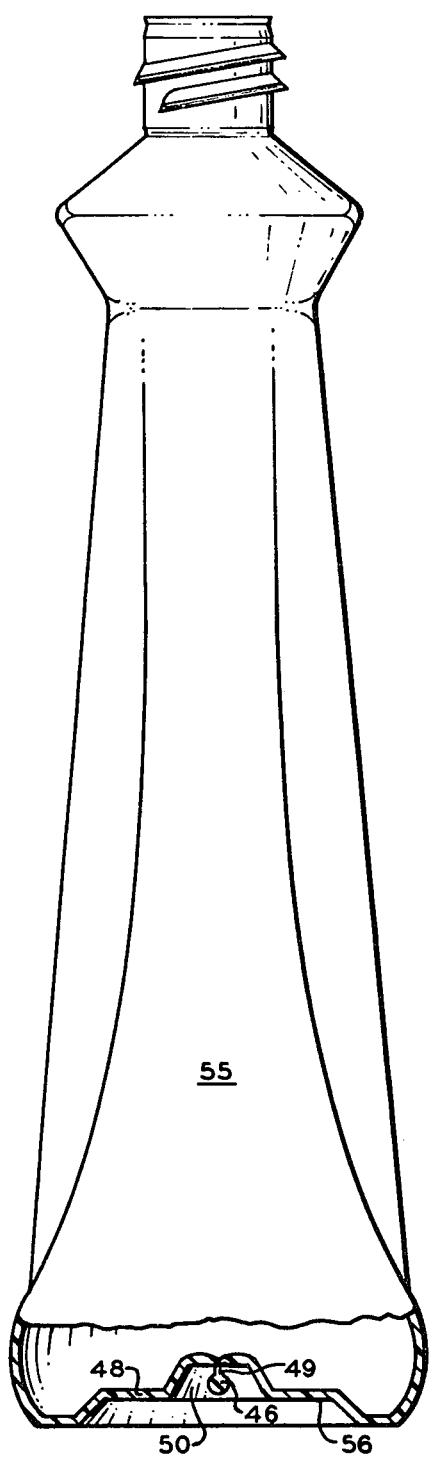
FIG. 8 is a sectional view of a bottle in accordance with the invention.

Viewing FIG. 2 in conjunction with FIG. 8, it can be seen that bead 46 and stem 49 are formed within longitudinal recess 50 immediately adjacent thereto by means of upwardly projecting portions 52 of inserts 30a. The width of lateral dimension of each flat top portion depicted by reference character 38a (and hence the width of the resulting recess adjacent the bottom wall of the article) on the inserts in FIG. 2 (reference character 38 referring to the entire bottom wall-forming surface) is about 1 to 150, preferably 25 to 75, mils although this will vary depending upon the size of the parison and will generally be in the neighborhood of 0.007 to 1, preferably 0.2 to 0.5, times the single wall thickness of the parison. Stated in terms relative to the size of the mold, surface 38a will generally have a width of 0.0004 to 0.06, preferably 0.01 to 0.04, times the average diameter of the bottom-forming portion of the mold. In some instances surface 38a may be up to three times as wide at the ends thereof as at the middle; in any event the above dimensions refer to the width in the middle, halfway between opposite ends of the bead. Surface 38b then slopes down toward surface 38c which forms the bottom portion of the bottle. Thus, cavity 44, stem-forming surface 42, and narrow bottom wall-forming surface 38a all project beyond adjacent general bottom wall-forming surface 38c. Surface 38b slopes primarily to facilitate opening of the mold since the sloping surface allows the bottom of the bottle to be deflected inward as the mold opens. Surprisingly, this has the additional beneficial effect of counteracting the normal tendency of a molded bottle to bulge outwardly at the bottom. Surface 38d simply forms that portion of the bottle around the periphery which normally comes in contact with the surface on which the bottle is placed.

Figure 10:
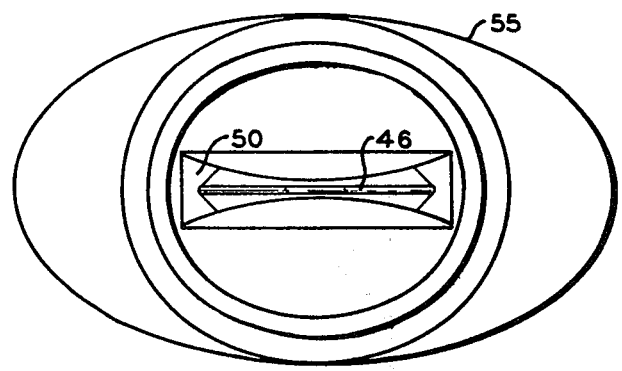
FIG. 10 is a bottom view of the bottle of FIG. 8.

FIG. 10 shows a bottom view of bottle 55 of FIG. 8 showing bead 46 within recess 50.

Figure 3:
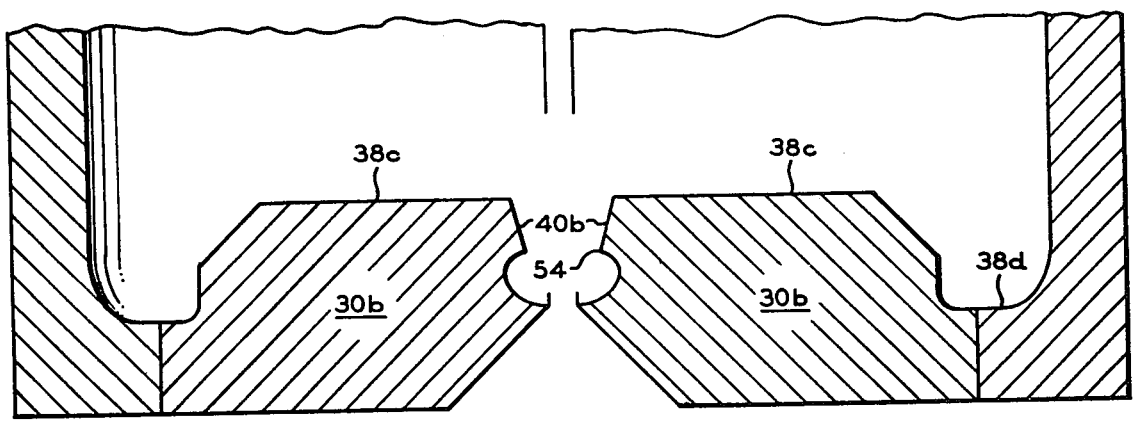
FIG. 3 is an enlarged sectional view of sealing and severing members in accordance with an alternative embodiment of the invention.

FIG. 3 shows an alternative embodiment of the invention wherein holding projections 40b slope back so as to form a stem which is flared adjacent the bottom wall of the article being molded. As noted hereinabove, this surprisingly prevents the polymer from being cut on the other side of the parison wall across from where the insert contacts the parison. The relative dimensions of the bead-forming cavity and holding projections are otherwise identical to those described in FIG. 2, that is, the distance from point 54 straight up to a point even with wall 38c would be the same as the height of flat land 42 of the insert shown in FIG. 2. Surfaces 40b slope back from a line parallel with a parting plane of the mold halves at an angle generally within the range of 1° to 25°, preferably 10° to 20° to give a corresponding slope of 1° to 25°, preferably 10° to 20°, to the sides of the stem. Actually the significant dimension is the relative spacing between the holding projection at a point adjacent the bead and adjacent the bottom wall, with the gap and hence the thickness of the stem adjacent the bottom wall generally being 1.5–4, preferably 2–2.5 times the gap and hence the thickness of the stem adjacent the bead. Thus the further holding projections extend up the less the angle would be. In this regard it must be emphasized that the speed at which the sealing and severing inserts close against the parison is a factor to be considered as the tearing which causes the voids referred to hereinabove is greater if the inserts are closed very rapidly against the parison. If too much tearing occurs, the parison pops open and assumes its initial generally round configuration with the severed end being open. This matter is also interrelated to parison temperature, axial tension on the parison, and the width of the gap between holding properties 40 relative to the parison wall thickness. It must be kept in mind that the parison at orientation temperature exhibits elastic properties. If the temperature is relatively low, i.e. just above that at which the polymer will shatter, the parison is more likely to tear and pop open. Specifically at temperatures just above where the polymer will shatter, closing times of 5 seconds or less will result in the parison popping open. Generally with a parison at orientation temperature the mold halves will move at a speed sufficient to close in about 0.3 to 3, preferably 0.5 to 1, second although since it is the speed of closing the final fraction of an inch that is important, this time could be reduced by closing rapidly at first and thereafter slowing the rate of closing.

Figure 5:
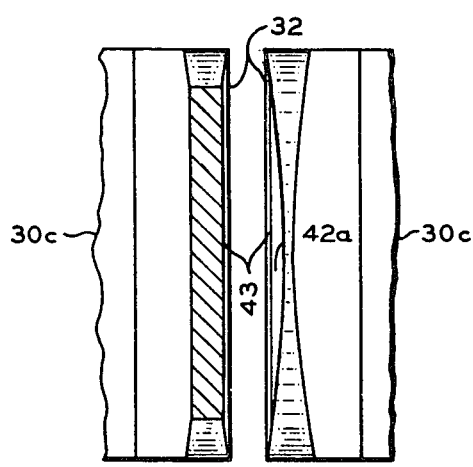
FIG. 5 is a view along section 5—5 of FIG. 4.

In a fully closed position the gap between holding projections 40 (that is, the width of the resulting stem 49) will generally be 25 to 100, preferably 45 to 60, mils, again depending on the thickness of the parison. Stated in terms relative to the thickness of the parison, the gap will generally be 20 to 55, preferably 30 to 40, percent of a single wall thickness of the parison before stretching. Especially good results are obtained utilizing a gap of 30 percent of a single wall thickness when preblow is utilized and 40 percent when no preblow is utilized. In connection with the width of the gap in instances such as in FIG. 3 where the stem varies in width from the point adjacent the wall to the point adjacent the bead, the above described dimensions refer to the portion adjacent the bead. With configurations such as shown in FIG. 5 (to be discussed hereinbelow), the above described dimensions are meant to refer to the portion in the center as opposed to the narrower portions at the edges (but still the portion of the center adjacent the bead).

Figure 4:
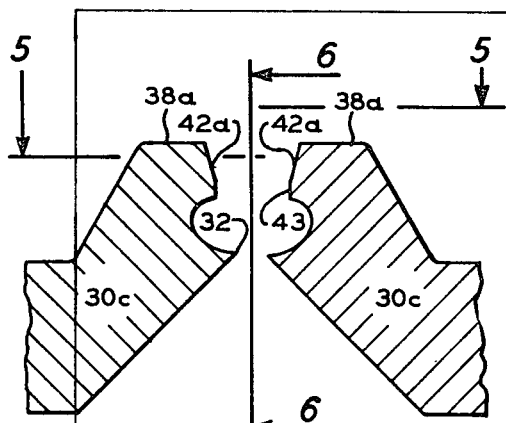
FIG. 4 is an enlarged sectional view of sealing and severing members combining the features of FIGS. 2 and 3.
Figure 6:
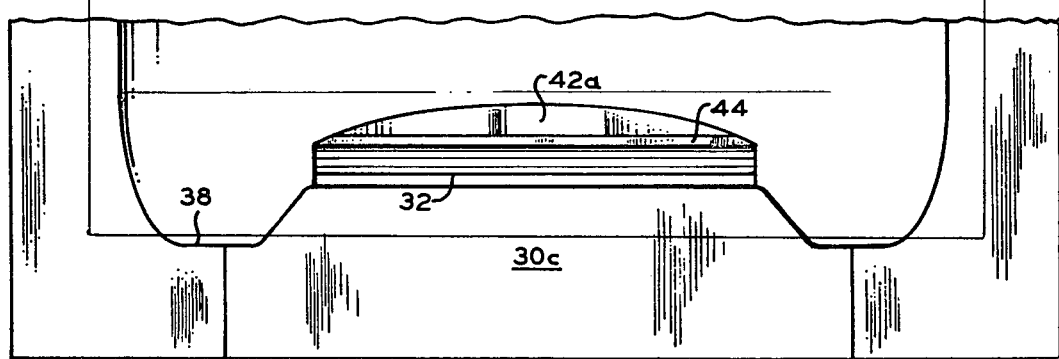
FIG. 6 is a view along line 6—6 of FIG. 4.

Referring now to FIG. 4 there is shown in cross section inserts 30c combining the features of FIGS. 2 and 3. As can be seen from FIG. 5, the configuration in FIG. 4 has the further feature of having a wider gap between faces 42a, 42a in the center than at the ends. Also as shown in FIG. 6 face 42a has a greater height in the center than at the ends. Faces 42a can have a short land area, i.e. area where opposing sides are parallel as shown by reference character 43. This land can be up to 30, preferably 5-25 percent of the total distance between edge 32 and surface 38a.

Figure 7:
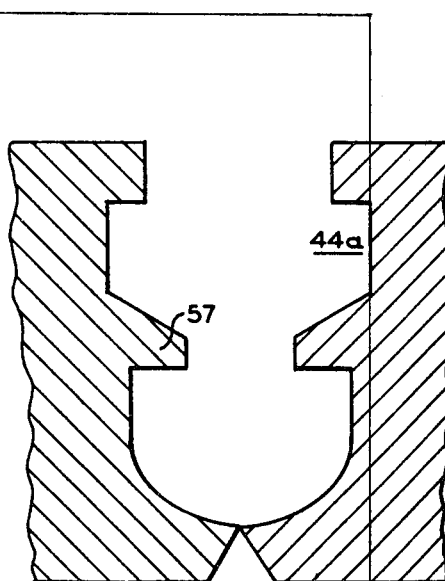
FIG. 7 is a view of sealing and severing members having an alternative shape for the bead.

FIG. 7 shows an alternative shape for the bead-forming cavity 44a wherein longitudinal projections or individual pins 56 are present. Because a polymer at orientation temperature is not readily moldable, provision for the members 57 requires that cavity 44a be longer than circular bead cavity 44.

FIG. 8 shows a cross section of a bottle 55 made in accordance with the invention and has been described hereinabove.

Figure 9:
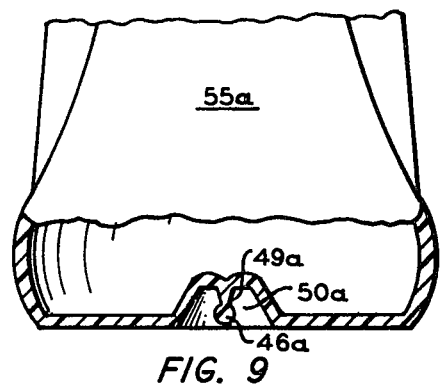
FIG. 9 is a sectional view of another bottle made in accordance with the invention.

FIG. 9 shows a cross section of bottle 55a wherein bead 46a and stem 49a are within recess 50a but which differs from the configuration of FIG. 8 in that the rest of the bottle bottom is entirely flat and the stem flares outward adjacent the bottom wall.

In the drawings, many conventional parts such as heaters, temperature controllers, frames, cooling channels, and the like have been omitted for the purpose of simplicity but their inclusion is understood by those skilled in the art and is within the scope of the invention.

EXAMPLE I

A series of polypropylene homopolymers having a density of 0.905 (ASTM D 1505-63T), and various melt flows as determined by ASTM D 1238-62T, Condition L, and a crystalline melting point of about 340° F were extruded into tubing having an outside diameter of 1.01-inch and a wall thickness of 0.165-inch. The tubing was cooled to room temperature in a vacuum sizing and quenching chamber and cut into 5.75-inch lengths. These 5.75-inch lengths were heated for 40 minutes. The thus-heated parisons were then placed in thread-forming jaws such as are shown in FIG. 1 while being held at the other end thereof by gripping fingers similar to those shown in FIG. 1. Relative axial movement was effected between the said thread-forming means and said gripping fingers to achieve a longitudinal stretch ratio of 2:1. Thereafter, preblow air at a pressure of about 25 psig was introduced into the interior of the parison to give a slight radical expansion to the parison. Thereafter, mold parts similar to those shown in FIG. 1 having configurations in the sealing and severing area identical to that shown in FIG. 4 were closed upon the parisons. These operations were carried out in immediate succession so that the parisons remained at orientation temperature. Main blow fluid at a pressure of about 135 psig was then introduced into the interior of the parison to cause it to conform to the shape of the mold to give a biaxially oriented bottle having clear, high strength walls. The resulting bottles were filled with water and 10 bottles were dropped from a height of 6 feet with the percentage passing the 6 foot drop being recorded. These tests were conducted at 1, 7, 14, 21 and 28 days. Results were as follows:

| Melt Flow | Pinch Off | Oven Temp. ° F | % Bottles Passing 6-foot Drop Bottle Age - days | | | | |
|---|---|---|---|---|---|---|---|
| | | | 1 | 7 | 14 | 21 | 28 |
| 3.50 | Control** | 322 | 30 | 30 | N.T.* | 0 | 10 |
| 3.50 | Invention | 322 | 100 | 100 | 100 | N.T.* | 100 |
| 3.05 | Control** | 321 | 90 | N.T.* | 100 | 80 | 100 |
| 3.05 | Invention | 321 | 100 | 100 | N.T.* | 100 | 100 |
| 2.20 | Control** | 322 | 70 | 70 | 100 | 70 | 70 |
| 2.20 | Invention | 322 | 100 | 100 | 100 | 100 | 100 |
| 1.08 | Control** | 322 | 80 | N.T.* | 100 | 90 | 80 |
| 1.08 | Invention | 322 | 100 | N.T.* | 100 | 100 | 100 |
| 0.87 | Control** | 325 | 100 | 100 | N.T.* | 100 | 100 |
| 0.87 | Invention | 325 | 100 | 100 | 100 | N.T.* | 100 |
| 0.81 | Control** | 321 | 90 | 100 | 100 | 90 | N.T.* |
| 0.81 | Invention | 321 | N.T.* | N.T.* | N.T.* | 100 | 100 |

*Not Tested.
**Configurations similar to FIG. 3 except having flat parallel lands 42 such as are shown in FIG. 2.

These data reveal that with the control pinch-off no more than 30 percent of the bottles made from 3.5 melt flow material passed the test. As the melt flow decreases the bottles, of course, become better with 90 to 100 percent passing at 0.81 melt flow. However, with bottles made using the pinch-off of the invention, 100 percent passed the test regardless of the melt flow within the range of melt flow tested.

EXAMPLE II

Identical parisons were molded in an identical manner to that of Example I except the sealing and severing member had essentially the configuration of FIG. 3, that is, the opposed faces of the members between the bead-forming cavity and the wall were tapered so as to give a wider stem adjacent the bottom wall of the article being manufactured, however, the stem and bead were not formed within a closely adjacent longitudinal recess as in the invention runs of Example I. The oven temperature was 322° F. One hundred percent of the bottles passed the 6-foot drop test after 14 days aging; however, only 50 percent passed after 28 days aging. In a duplicate run, 90 percent passed after one day, 80 percent after 2 days, 30 percent after 14 days and 50 percent after 28 days aging. However, in both cases the bottles had improved appearance and improved permeability characteristics due to the absence of holes or thin areas on the seal as compared with bottles made in an identical manner except with a sealing and severing member having parallel opposed faces on the stem-forming holding projections like faces 42 of FIG. 2.

CALCULATED ILLUSTRATIVE EMBODIMENT 1

Identical parisons to those used in Examples I and II are fabricated in an identical manner except the sealing and severing portions of the mold halves have the configuration shown in FIG. 2, that is, the facing surfaces of the sealing and severing members have flat parallel configuration between the bottom wall-forming portion and the bead-forming portion with the entire sealing seam being formed in a closely adjacent longitudinal recess. The resulting bottles have improved impact strength relative to bottles made without the bead being formed in a closely adjacent recess, however, the bottles have a series of voids running along the seal line on the inside of the bottle.

While this invention has been described in detail for the purpose of illustration, it is not be be construed as limited thereby but is intended to cover all changes and modifications within the spirit and scope thereof.

What is claimed is:

1. A method for closing an open and thermoplastic parison which has been heated in the solid state to orientation temperature comprising:
    stretching said parison longitudinally;
    thereafter applying pressure along a narrow line to opposing side walls of said parison to sever said parison while simultaneously applying lateral pressure to said parison adjacent said severing line to mold said parison adjacent said severing line into a bead along the thus-formed sealing seam while applying pressure along a narrow line between said bead and a bottom wall of the resulting article to form a stem connecting said bead and said bottom wall, said stem being tapered with the wider base portion being adjacent said bottom wall and with sides of said stem sloping at an angle of 10° to 20° so that said stem has a thickness adjacent said bottom wall 1.5 to 4 times a thickness thereof adjacent said bead; and
    maintaining pressure on said bead to hold said walls of said parison together and form a seal as blow fluid is introduced into the interior of said parison to cause same to conform to the shape of a molding zone.

2. A method according to claim 1 wherein said polymer is polypropylene.

3. A method according to claim 1 wherein said pressure is applied by mold halves closing at a rate sufficient that the total closing time is within the range of 0.5 to 1 second.

4. A method according to claim 1 wherein said pressure applied along said narrow line between said bead and said bottom wall to produce said stem is applied so as to form said stem with a greater distance between said bead and said bottom wall in a center of said bead than at ends thereof.

5. A method according to claim 1 wherein said stem is formed within a closely adjacent longitudinal recess.

* * * * *

UNITED STATES PATENT AND TRADEMARK OFFICE
CERTIFICATE OF CORRECTION

PATENT NO. : 4,026,984
DATED : May 31, 1977
INVENTOR(S) : Charles L. Seefluth

It is certified that error appears in the above-identified patent and that said Letters Patent are hereby corrected as shown below:

Claim 1, line 1, "and" should be -- end -- .

Signed and Sealed this

Twenty-seventh Day of September 1977

[SEAL]

Attest:

RUTH C. MASON
Attesting Officer

LUTRELLE F. PARKER
Acting Commissioner of Patents and Trademarks